United States Patent
Kang et al.

(10) Patent No.: US 8,698,951 B2
(45) Date of Patent: Apr. 15, 2014

(54) CAMERA MODULE

(75) Inventors: Hwan Jun Kang, Gyunggi-do (KR); Jin Su Seok, Gyunggi-do (KR); Chul Min Han, Seoul (KR)

(73) Assignee: Samsung Electro-Mechanics Co., Ltd, Gyunggi-Do (KR)

( * ) Notice: Subject to any disclaimer, the term of this patent is extended or adjusted under 35 U.S.C. 154(b) by 354 days.

(21) Appl. No.: 13/101,928

(22) Filed: May 5, 2011

(65) Prior Publication Data

US 2012/0236248 A1    Sep. 20, 2012

(30) Foreign Application Priority Data

Mar. 17, 2011    (KR) ........................ 10 2011 0023799

(51) Int. Cl.
*H04N 5/225*    (2006.01)
(52) U.S. Cl.
USPC ............................ 348/374; 348/340; 348/373
(58) Field of Classification Search
None
See application file for complete search history.

(56) References Cited

U.S. PATENT DOCUMENTS

| 7,563,041 | B2 * | 7/2009 | Kang ............................. 396/506 |
| 7,929,230 | B2 * | 4/2011 | Chang ........................... 359/824 |
| 8,233,083 | B2 * | 7/2012 | Takatsuka et al. ............ 348/376 |
| 2008/0119070 | A1 * | 5/2008 | Yang ............................... 439/77 |

FOREIGN PATENT DOCUMENTS

| JP | 2007-292845 | * 11/2007 |
| JP | 2009-080282 | * 4/2009 |

OTHER PUBLICATIONS

Office Action dated Jul. 19, 2012 for related KR App. No. 10-2011-0023799 and partial English.

* cited by examiner

*Primary Examiner* — Luong T Nguyen
(74) *Attorney, Agent, or Firm* — Ladas & Parry, LLP

(57) ABSTRACT

Disclosed herein is a camera module including: a lens barrel mounted with a camera lens; a housing including an exposing hole and guide portions formed on the top thereof, the exposing hole being opposite to the camera lens; a printed circuit board fixed to the housing; and an LC lens module including an LC lens and guided to the guide portions of the housing to thereby be coupled to the housing so that the LC lens is positioned on the same axis as the center of the lens.

9 Claims, 7 Drawing Sheets

CAMERA MODULE

CROSS REFERENCE TO RELATED APPLICATION

This application claims the benefit of Korean Patent Application No. 10-2011-0023799, filed on Mar. 17, 2011, entitled "Camera Module", which is hereby incorporated by reference in its entirety into this application.

BACKGROUND OF THE INVENTION

1. Technical Field

The present invention relates to a camera module.

2. Description of the Related Art

In accordance with recent increase in occupancy of a smart phone providing various displays and applications, it has been demanded that a mobile communication terminal reduce its module size for high density mounting inside a set and a H/W module with high specification.

Therefore, a camera module for a mobile communication terminal has been developed into a high resolution auto focus module capable of having a compact and ultra thin structure and photographing a moving image.

In particular, there are some limitations in implementing the requirements of camera module for the mobile communication terminal, such as high resolution, high function, compactness, and ultra thin type, with a lens driving type auto focus module according to the prior art.

In addition, an actuator moving a lens barrel is used so as to have functions of an auto focus to automatically adjust the focus and for preventing handshaking and, for example, a piezo actuator and a voice coil actuator are widely used. However, in the camera module, foreign substances are introduced into a printed circuit board, an IR filter, or the like positioned therein due to the driving of the actuator, such that defects and operation errors thereof may be caused. In order to solve these problems, the camera module has been provided with a foreign substance blocking member or has changed a structure and a shape thereof; however, the problems could not be fundamentally solved.

SUMMARY OF THE INVENTION

The present invention has been made in an effort to provide a camera module that has a technical configuration in which a liquid crystal (LC) lens has liquid crystal layers of which an arrangement is controlled by an application of voltage to be capable of performing the auto focus function and the center of the LC lens is positioned to correspond to the central axis of a camera lens, and to provide advantages in that the problem of generating foreign substances by an actuator may be fundamentally solved as well as the auto focus function may be stably performed; a long distance focusing process may be deleted; the camera module may be more stably and strongly implemented simultaneously while simplifying a manufacturing process thereof, through a lens barrel integrated housing; and an electrical connecting portion connecting the LC lens and a LC lens module body is exposed to the outside of the housing so that the connection state may be checked by the naked eye and additional repairs thereof may also be easily and simply performed.

According to a preferred embodiment of the present invention, there is provided a camera module including: a lens barrel mounted with a camera lens; a housing including an exposing hole and guide portions formed on the top thereof, the exposing hole being opposite to the camera lens; a printed circuit board fixed to the housing; and a LC lens module including a LC lens and guided to the guide portions of the housing to thereby be coupled to the housing so that the LC lens is positioned on the same axis as the center of the camera lens.

The guide portions may be guide projections formed on a top outer side of the housing, and the LC lens module may be coupled to the guide projections so that the center of the camera lens and the center of the LC lens are positioned on the same axis.

The LC lens module may include: the LC lens having liquid crystal layers of which an arrangement is controlled by an application of voltage; and a LC lens module body having the LC lens coupled thereto and a contact pin portion electrically connected to the printed circuit board.

The LC lens module may further include conductive bonding portions electrically connecting the LC lens to the LC lens module body.

The LC lens module body may include fixing grooves corresponding to the guide portions of the housing and may further include a flexible connecting portion positioned at the side of the housing to allow the extended direction of the LC lens module body to be switched such that the LC lens is positioned on the top of the housing, corresponding to the camera lens, and the contact pin portion is in contact with the printed circuit board.

The LC lens may be fixed to the guide portions on the top of the housing, the LC lens module body may be positioned on the top of the LC lens, and the LC lens may be electrically connected to the LC lens module body by conductive bonding portions.

The LC lens module body may be fixed to the guide portions on the top of the housing, the LC lens may be positioned on the top of the LC lens module body, and the LC lens may be electrically connected to the LC lens module body by conductive bonding portions.

The housing may include lens barrel receiving grooves faulted at the bottom thereof, wherein the lens barrel receiving grooves receive the lens barrel.

The housing may have coupling projections formed at the edge thereof corresponding to the printed circuit board, and the printed circuit board may have coupling grooves formed therein corresponding to the coupling projections, wherein the coupling projections are inserted into the coupling grooves to couple and fix the housing to the printed circuit board.

In a camera module according to another preferred embodiment of the present invention, the LC lens module body may be guided by the guide portions of the housing to be fixed onto the top of the housing, the LC lens may be positioned on the top of the LC lens module body, and the LC lens may be electrically connected to the LC lens module body by conductive bonding portions.

The housing may have coupling projections formed at the edge thereof corresponding to the printed circuit board, and the printed circuit board may have coupling grooves formed therein corresponding to the coupling projections, wherein the coupling projections are inserted into the coupling grooves to couple and fix the housing to the printed circuit board.

According to another preferred embodiment of the present invention, there is provided a camera module including: a lens barrel integrated housing including receiving grooves formed at the bottom thereof, the receiving grooves receiving a camera lens therein, and an exposing hole and guide portions formed on the top thereof, the exposing hole being opposite to the camera lens; a printed circuit board connected to the bottom of the lens barrel and fixed to the housing; and a LC lens module including a LC lens and guided to the guide portions of the housing to thereby be coupled to the housing so that the LC lens is positioned on the same axis as the center of the camera lens.

The LC lens module may include: an LC lens having liquid crystal layers of which an arrangement is controlled by an application of voltage; and a LC lens module body having the LC lens coupled thereto, having fixing grooves corresponding to the guide portions of the integrated lens barrel housing, and having a contact pin portion electrically connected to the printed circuit board.

DESCRIPTION OF THE PREFERRED EMBODIMENTS

Figure 1:
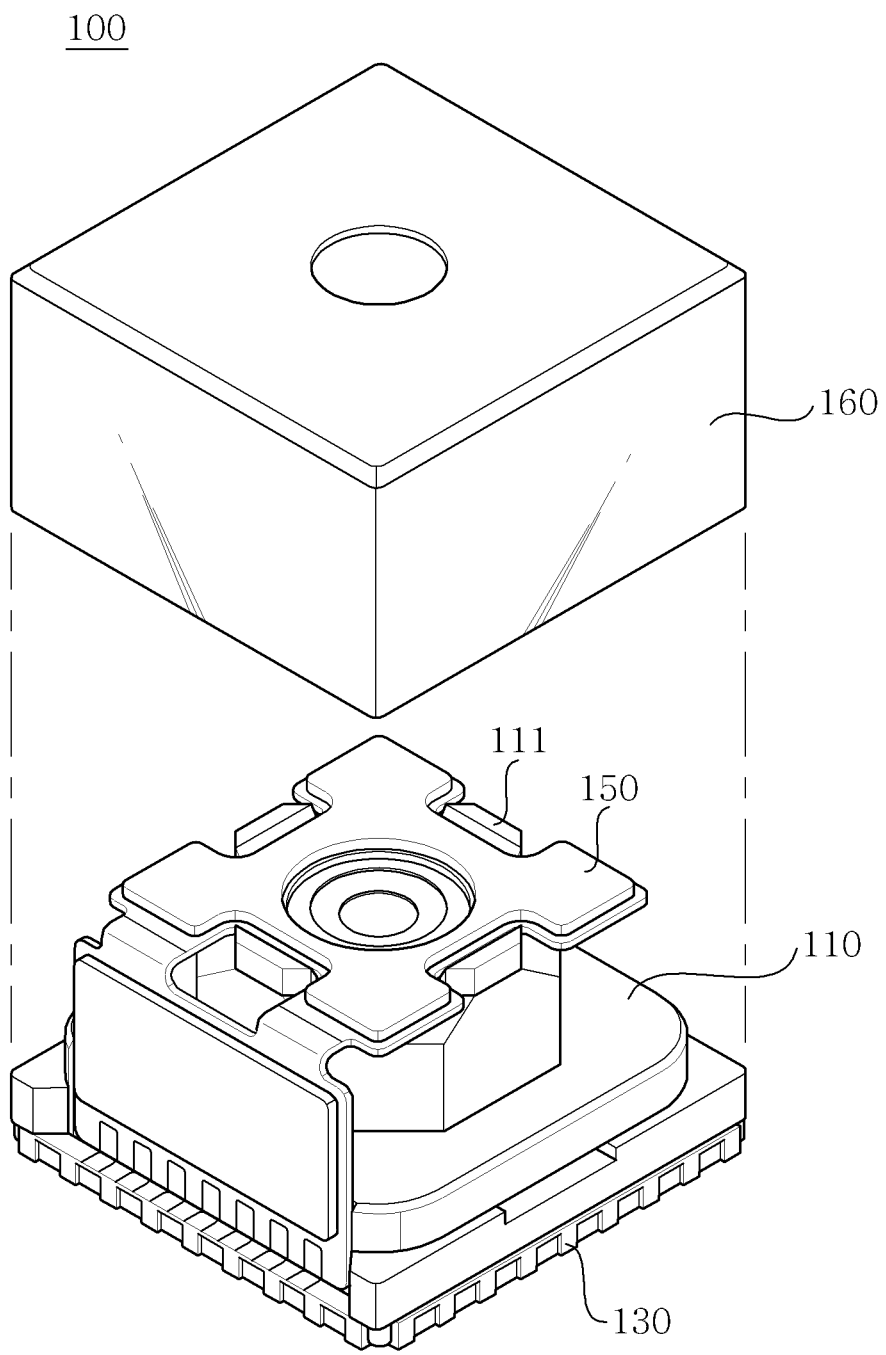
FIG. 1 is a partially exploded perspective view schematically showing a camera module according to an embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, a detailed description thereof will be omitted.

Hereinafter, a camera module according to preferred embodiments of the present invention will be described in detail with reference to the accompanying drawings.

Figure 2:
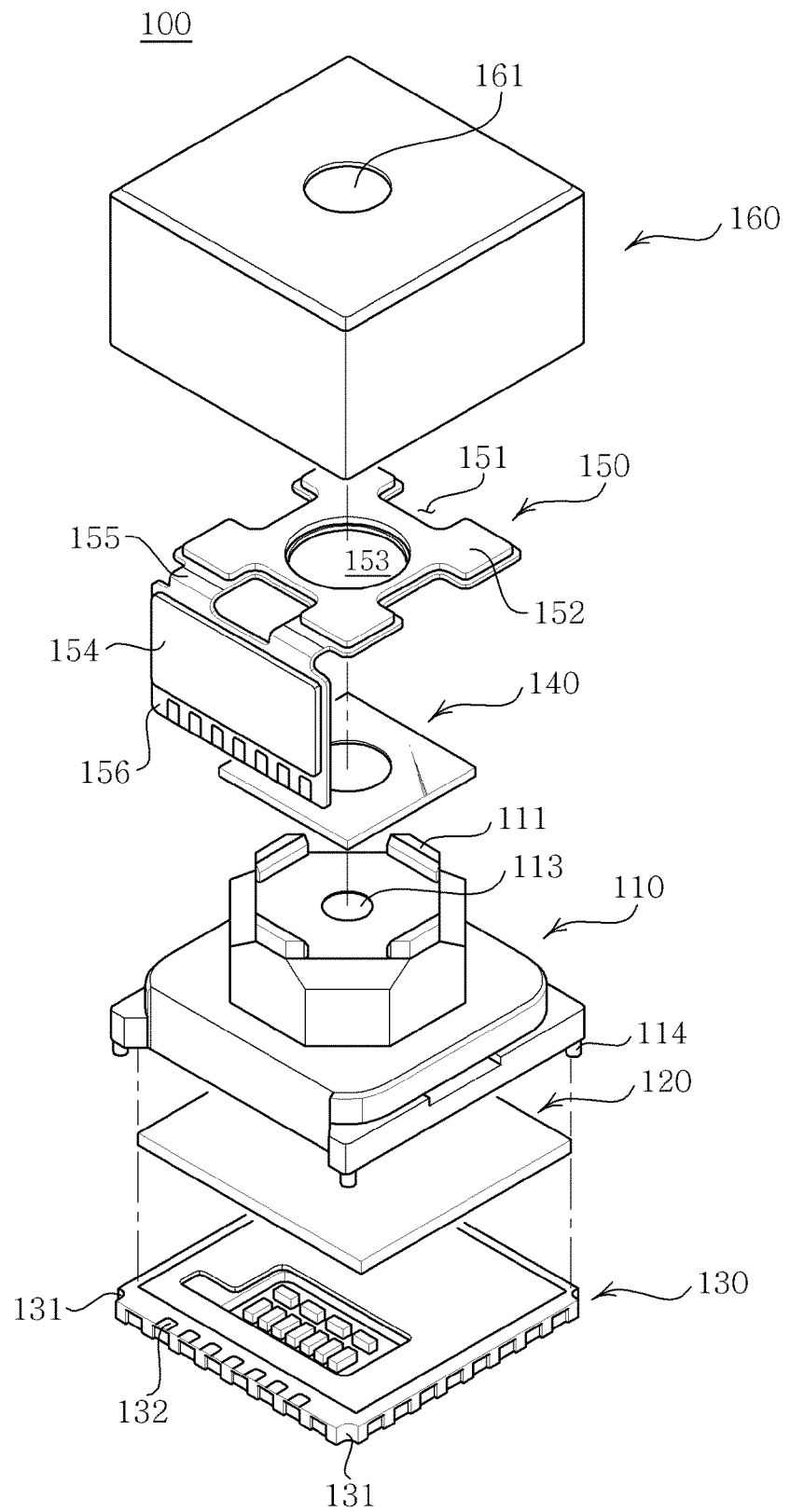
FIG. 2 is an exploded perspective view schematically showing the camera module of FIG. 1.
Figure 3A:
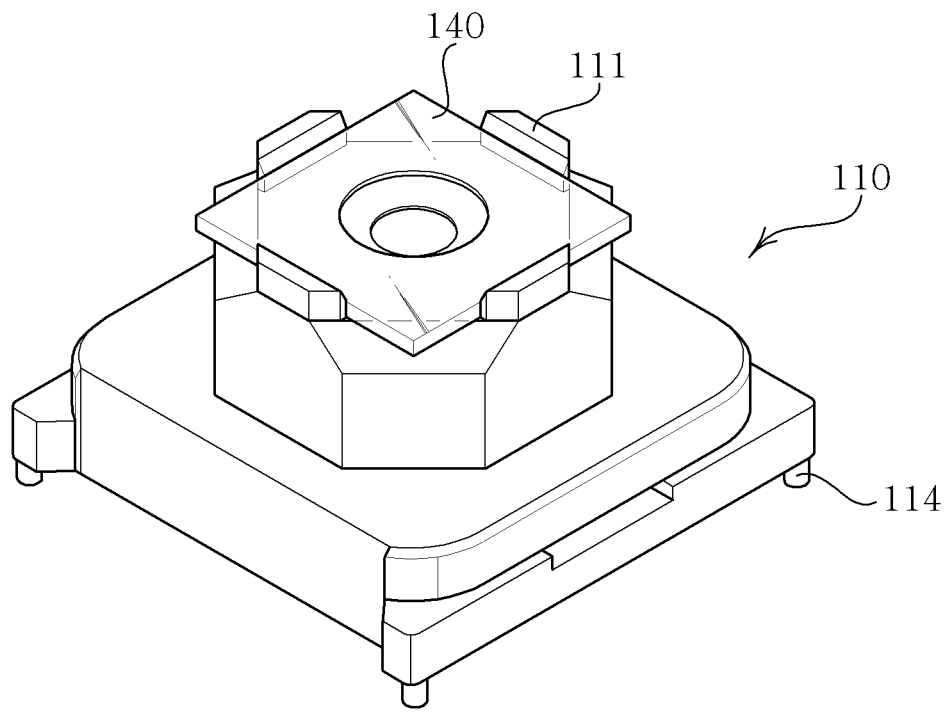
FIGS. 3A to 3E are perspective views schematically showing a manufacturing process of a camera module according to the present invention.
Figure 3B:
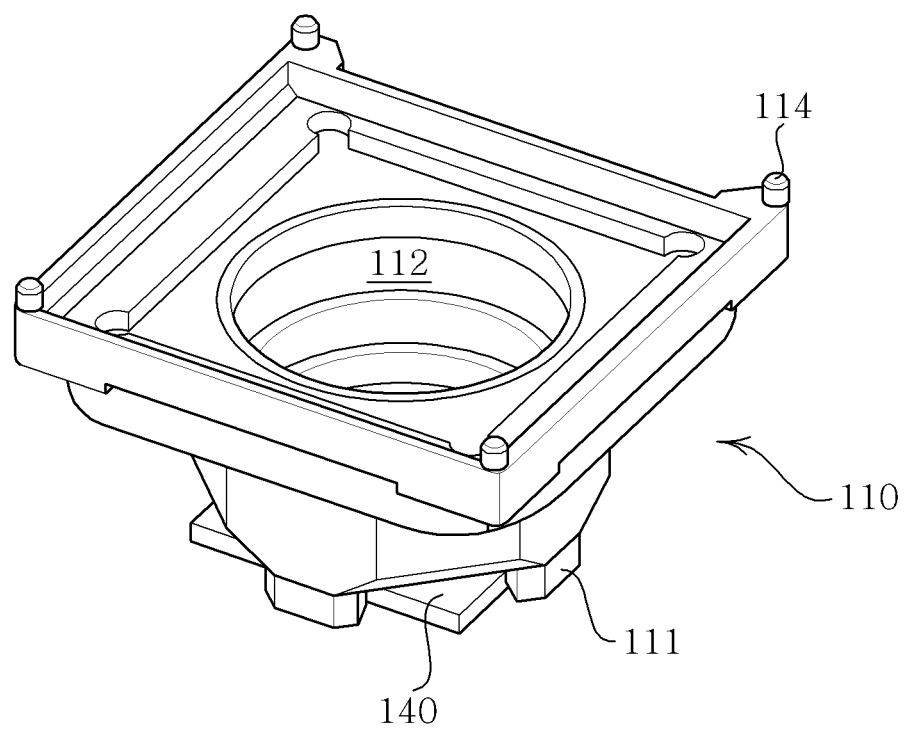
Figure 3C:
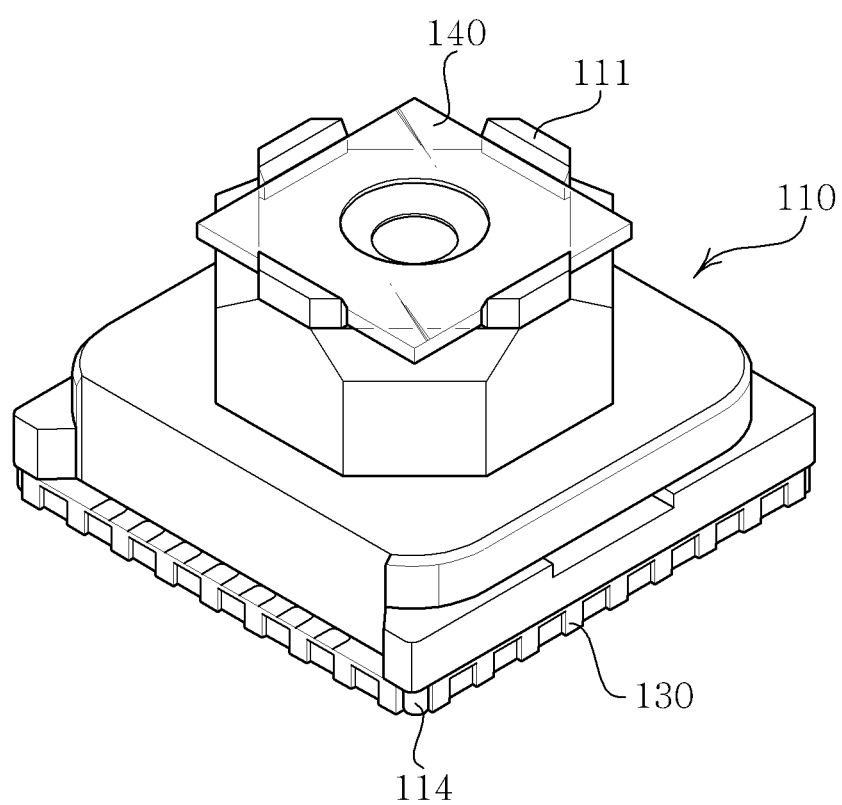
Figure 3D:
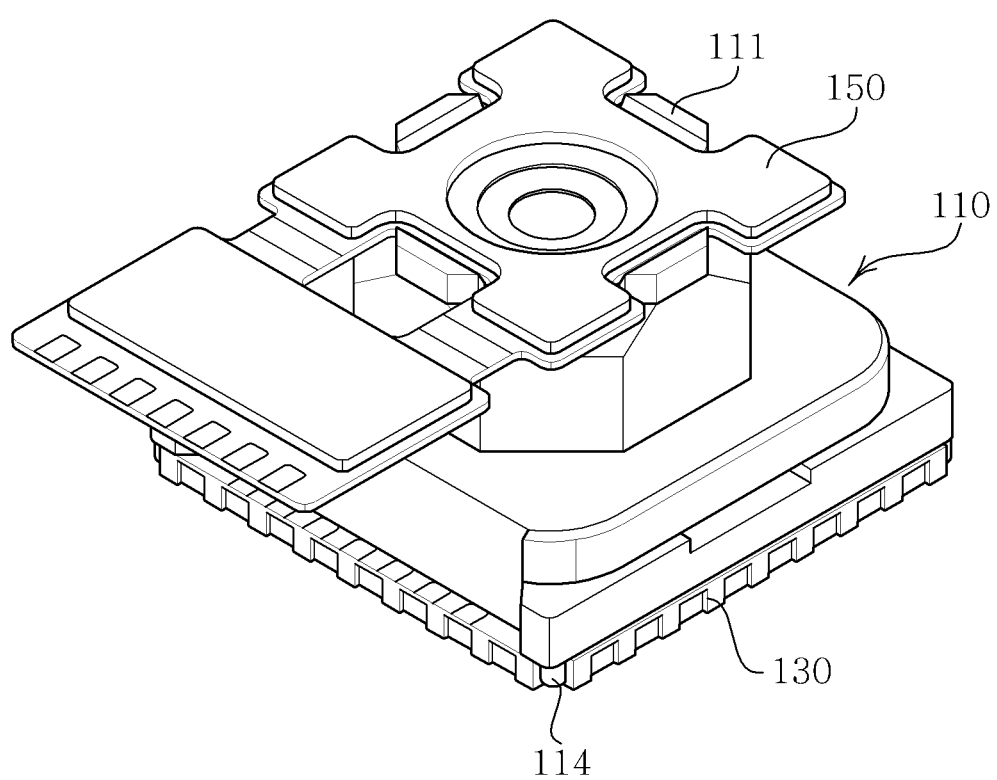
Figure 3E:
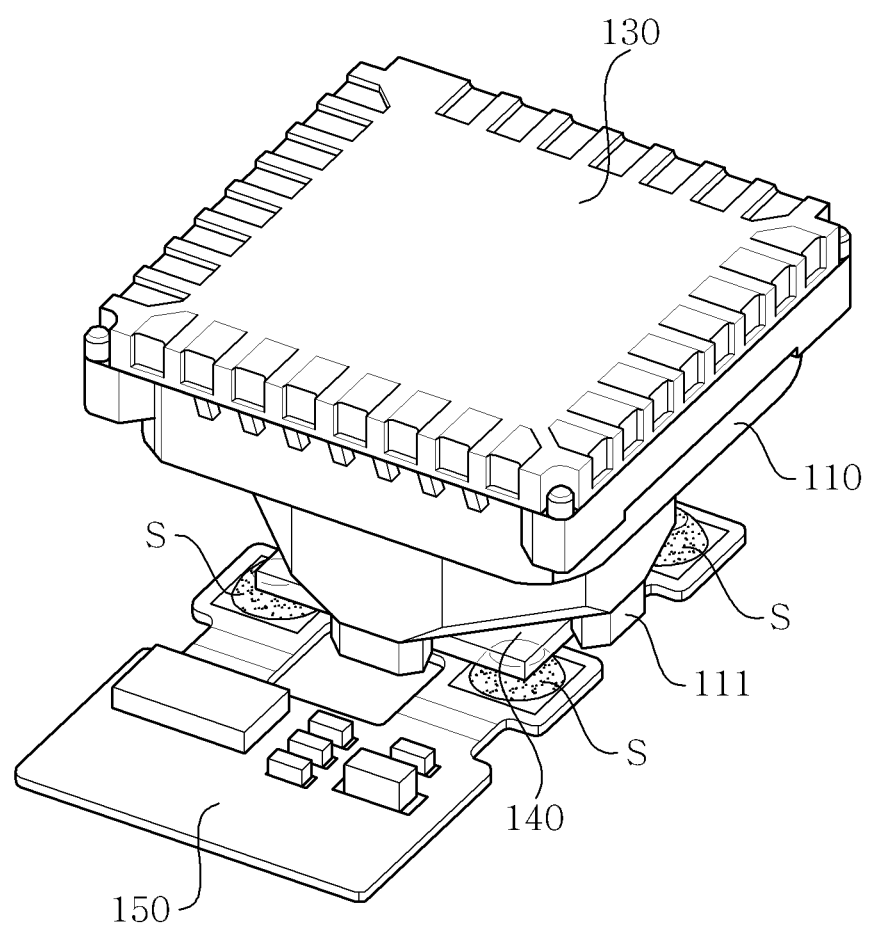

FIG. 1 is a partially exploded perspective view schematically showing a camera module according to an embodiment of the present invention, and FIG. 2 is an exploded perspective view schematically showing the camera module of FIG. 1. As shown in the figures, the camera module 100 is configured to include a lens barrel (not shown), a housing 110, an image sensor 120, a printed circuit board 130, an LC lens module including an LC lens 140, and an LC lens module body 150, and a case 160.

The lens barrel (not shown) is mounted with a camera lens.

The housing 110 includes a lens barrel receiving grooves 112 formed on the bottom thereof, the lens barrel receiving grooves 112 receiving the lens barrel, and an exposing hole 113 and guide portions 111 formed on the top thereof, the exposing hole 113 being opposite to the camera lens. The exposing hole 113 exposes the camera lens mounted in the housing to the outside.

In addition, the guide portions 111 guide the LC lens 140 and the LC lens module body 150 positioned on the top of the housing to be positioned on the same axis as the center of the camera lens. The guide portions 111 allow the LC lens 140 and the LC lens module body 150 to have a stable structure, while being more effective in assembling and fixing them. To this end, the guide portions 111 are formed of guide projections as an embodiment of the present invention. The guide portions 111 may have various shapes and numbers thereof. In FIGS. 1 and 2, four guide portions are formed at the edges of a top outer side of the housing as an embodiment of the present invention, the four guide portions being opposite to each other.

The housing 110 according to the present invention may be implemented as a lens barrel integrated housing, wherein the lens barrel integrated housing includes the lens receiving grooves formed at the bottom thereof, the lens receiving grooves receiving the camera lens therein, and the exposing hole 113 and the guide portions 111 formed on the top thereof, the exposing hole 113 being opposite to the camera lens. The housing 110 may be provided with coupling projections 114 formed at the edges thereof, corresponding to the printed circuit board, the coupling projections 114 coupling and fixing the printed circuit board.

The image sensor 120 is coupled to the printed circuit board 130 and the printed circuit board 130 is connected to the bottom of the lens barrel together with the image sensor 120 to thereby be fixed to the housing. To this end, the printed circuit board 130 is formed with coupling grooves 131 corresponding to the coupling protections 114 of the housing, wherein the coupling projections 114 are inserted into the coupling grooves 131 to thereby couple and fix the housing 110 to the printed circuit board 130. In addition, the printed circuit board 130 includes contact portions 132 electrically contacting the LC lens module.

The LC lens module includes the LC lens 140 and the LC lens module body 150.

The LC lens 140 has liquid crystal layers of which an arrangement is controlled by the application of the voltage to thereby be capable of performing the auto focus function, and is inserted and coupled into the guide portions 111 of the housing 110 to thereby be positioned on the same axis as the camera lens of the housing 110.

The LC lens module body 150 is coupled to the LC lens 140 to thereby be fixed to the housing 110. More specifically, the LC lens module body 150 includes an upper body 152 and a side body 154, wherein the side body 154 is positioned at the side of the housing and includes a contact pin portion 156 electrically connected to the printed circuit board. In addition, the upper body 152 is positioned on the top of the housing 110 and is formed with fixing grooves 151 corresponding to the guide portions 111 and an exposing hole 153 corresponding to the exposing hole 113 of the housing 110.

In addition, the LC lens module body 150 according to the present invention further includes a flexible connecting portion 155 connecting the upper body 152 and the side body 154. In other words, the flexible connecting portion 155 is positioned at the side of the housing 110 to allow the extended direction of the LC lens module body to be switched such that the LC lens 140 is positioned on the top of the housing, corresponding to the camera lens, and the contact pin portion 156 is in contact with the contact portion 132 of the printed circuit board 130.

The contact pin portion 156 is electrically connected to the contact portion 132 of the printed circuit board. To this end, conductive bonding portions (not shown) may be formed.

In addition, in the LC lens module according to the present invention, the LC lens 140 is electrically connected to the LC lens module body 150 by the conductive bonding portions.

The LC lens module body 150 configured as described above is coupled and fixed to the housing 110 by inserting the fixing grooves 151 into the guide portions 111 of the housing 110.

The case 160 is coupled to the printed circuit board 130, while having an exposing hole 161 formed at the same axis as the exposing hole 113 of the housing and the exposing hole 153 of the LC lens module body 150 and covering the housing 110, the image sensor 120, and the LC lens module.

Hereinafter, a method of manufacturing a camera module according to the present invention will be described in detail. FIGS. 3A to 3E are perspective views schematically showing a manufacturing process of a camera module according to the present invention. As shown in the figures, the LC lens 140 is inserted and seated through the guide portions 111 of the housing 110.

The LC lens 140 is fixed to the housing by applying UV bond or curing bond thereto and then the lens barrel or the camera lens is inserted into the lens barrel receiving grooves 112 formed at the bottom thereof. A lens barrel according to the prior art is formed to have a separate housing structure, however, the housing according to the present invention may be formed integral with the lens barrel and thus, an assembling process and a checking process according to the prior art may be omitted.

The printed circuit board 130 having the image sensor 120 coupled thereto is coupled to the bottom of the housing 110. In addition, a foreign substance inspection process and a cleaning process are performed before the printed circuit board 130 is coupled, the management of foreign substance of a material may be reinforced.

The LC lens module body 150 is positioned on the top of the LC lens 140 in a stacked direction of the LC lens 140 coupled to the housing. In this case, the LC lens module body 150 is coupled and fixed through the guide portions 111 of the housing. In other words, in FIG. 3E, the LC lens module body 150 is positioned under the LC lens 140 and the LC lens 140 is electrically connected to the LC lens module body 150 by conductive bonding portions S, that is, soldering. In this case, even though the conductive bonding portions S are applied to be higher than the LC lens 140, mechanical strength against external force may be secured and workability may be improved by performing the application at four points.

Figure 4:
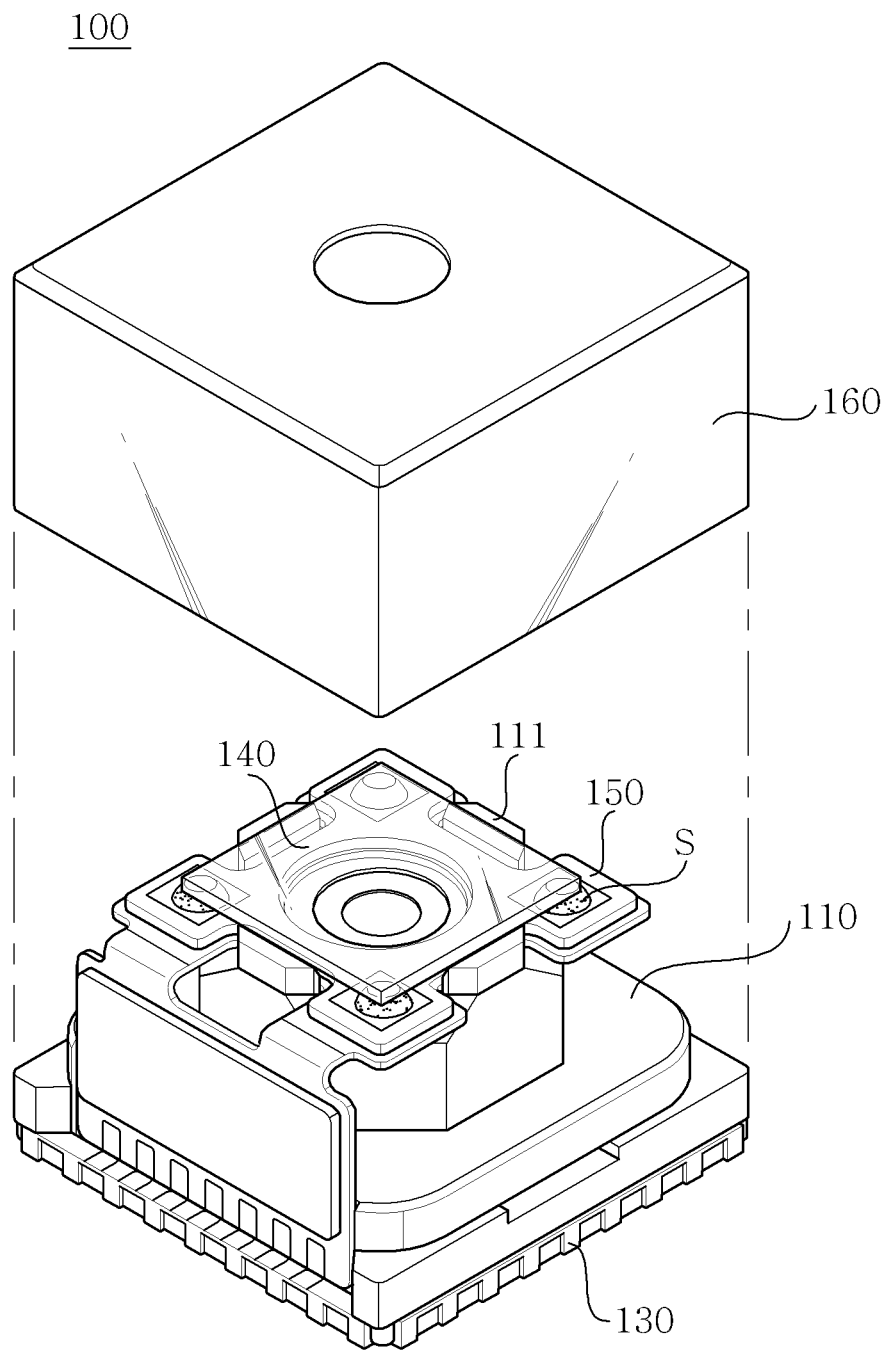
FIG. 4 is a partially exploded perspective view schematically showing a camera module according to another embodiment of the present invention.

FIG. 4 is a partially exploded perspective view schematically showing a camera module according to another embodiment of the present invention. As shown in FIG. 4, a camera module 100 includes the technical configuration as the camera module of FIG. 1; however, an LC lens 140 is positioned on the tope of an LC lens module body 150 therein. In other words, the LC lens module body 150 is coupled to the top of the housing 110, while the fixing grooves 151 thereof are inserted into the guide portions 111 of the housing 110, the LC lens 140 is positioned on the top of the LC lens module body 150, and the LC lens 140 is electrically connected to the LC lens module body 150 by conductive bonding portions S, that is, soldering.

As configured above, the conductive bonding portions S are exposed to the outside of the housing 110. Therefore, the connection and contact state of the LC lens 140 may be checked by the naked eye and additional repairs thereof may also be easily and simply performed.

As set forth above, according to preferred embodiments of the present invention, a camera module has a technical configuration in which a liquid crystal (LC) lens has liquid crystal layers of which an arrangement is controlled by an application of voltage to be capable of performing the auto focus function and the center of the LC lens is positioned to be correspond to the central axis of a camera lens. The problem of generating foreign substances by an actuator may be fundamentally solved as well as the auto focus function may be stably performed. A long distance focusing process may be deleted. The camera module may be more stably and strongly implemented simultaneously with simplifying a manufacturing process thereof, through a lens barrel integrated housing. In addition, an electrical connecting portion connecting the LC lens and a LC lens module body is exposed to the outside of the housing so that the connection state may be checked by the naked eye and additional repairs thereof may also be easily and simply performed.

Although the embodiment of the present invention has been disclosed for illustrative purposes, it will be appreciated that a camera module according to the invention is not limited thereby, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A camera module comprising:
    a lens barrel mounted with a camera lens;
    a housing including an exposing hole and guide portions formed on the top thereof, the exposing hole being opposite to the camera lens;
    a printed circuit board fixed to the housing; and
    a liquid crystal (LC) lens module including an LC (liquid crystal) lens and guided to the guide portions of the housing to thereby be coupled to the housing so that the LC lens is positioned on the same axis as the center of the camera lens,
    wherein the LC lens module includes:
    the LC lens having liquid crystal layers of which an arrangement is controlled by an application of voltage; and
    an LC lens module body having the LC lens coupled thereto and a contact pin portion electrically connected to the printed circuit board,
    wherein the LC lens module body includes fixing grooves corresponding to the guide portions of the housing and further includes a flexible connecting portion positioned at the side of the housing to allow the extended direction of the LC lens module body to be switched such that the LC lens is positioned on top of the housing, corresponding to the camera lens, and the contact pin portion is in contact with the printed circuit board.

2. The camera module as set forth in claim 1, wherein the guide portions are guide projections formed on a top outer side of the housing, and the LC lens module is coupled to the guide projections so that the center of the camera lens and the center of the LC lens are positioned on the same axis.

3. The camera module as set forth in claim 1, wherein the LC lens module further includes conductive bonding portions electrically connecting the LC lens to the LC lens module body.

4. The camera module as set forth in claim 1, wherein the LC lens is fixed to the guide portions on the top of the housing, the LC lens module body is positioned on the top of the LC lens, and the LC lens is electrically connected to the LC lens module body by conductive bonding portions.

5. The camera module as set forth in claim 1, wherein the LC lens module body is fixed to the guide portions on the top of the housing, the LC lens is positioned on the top of the LC lens module body, and the LC lens is electrically connected to the LC lens module body by conductive bonding portions.

6. The camera module as set forth in claim 1, wherein the housing includes lens barrel receiving grooves formed at the bottom thereof, the lens barrel receiving grooves receiving the lens barrel.

7. The camera module as set forth in claim 1, wherein the housing has coupling projections formed at the edge thereof corresponding to the printed circuit board, and the printed circuit board has coupling grooves formed therein corresponding to the coupling projections, the coupling projections being inserted into the coupling grooves to couple and fix the housing to the printed circuit board.

8. A camera module comprising:
a lens barrel integrated housing including receiving grooves formed at the bottom thereof, the receiving grooves receiving a camera lens therein, and an exposing hole and guide portions formed on the top thereof, the exposing hole being opposite to the camera lens;
a printed circuit board connected to the bottom of the lens barrel and fixed to the housing; and
a liquid crystal (LC) lens module including an LC lens and guided to the guide portions of the housing to thereby be coupled to the housing so that the LC lens is positioned on the same axis as the center of the camera lens,
wherein the LC lens module includes:
an LC lens having liquid crystal layers of which an arrangement is controlled by an application of voltage; and
an LC lens module body having the LC lens coupled thereto, having fixing grooves corresponding to the guide portions of the integrated lens barrel housing, and having a contact pin portion electrically connected to the printed circuit board,
wherein LC lens module body further includes a flexible connecting portion positioned at the side of the lens barrel integrated housing to allow the extended direction of the LC lens module body to be switched such that the LC lens is positioned on top of the housing, corresponding to the camera lens, and the contact pin portion is in contact with the printed circuit board.

9. A camera module comprising:
a lens barrel mounted with a camera lens;
a housing including an exposing hole and guide portions formed on the top thereof, the exposing hole being opposite to the camera lens;
a printed circuit board fixed to the housing; and
a liquid crystal (LC) lens module including an LC (liquid crystal) lens and guided to the guide portions of the housing to thereby be coupled to the housing so that the LC lens is positioned on the same axis as the center of the camera lens,
wherein the housing has coupling projections formed at the edge thereof corresponding to the printed circuit board, and the printed circuit board has coupling grooves formed therein corresponding to the coupling projections, the coupling projections being inserted into the coupling grooves to couple and fix the housing to the printed circuit board.

\* \* \* \* \*